(12) United States Patent
Fritz

(10) Patent No.: US 8,083,488 B2
(45) Date of Patent: Dec. 27, 2011

(54) BLADE EXTENSION FOR ROTOR BLADE IN WIND TURBINE

(75) Inventor: Peter James Fritz, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/861,145

(22) Filed: Aug. 23, 2010

(65) Prior Publication Data

US 2011/0142635 A1 Jun. 16, 2011

(51) Int. Cl.
F03D 11/00 (2006.01)
(52) U.S. Cl. .................. 416/224; 416/228; 416/235
(58) Field of Classification Search .............. 415/224, 415/228, 235, 238; 416/224, 228, 235, 238
See application file for complete search history.

(56) References Cited

U.S. PATENT DOCUMENTS

| | | | |
|---|---|---|---|
| 2,312,219 A | 4/1943 | Sensenich | |
| 4,720,244 A * | 1/1988 | Kluppel et al. | 416/224 |
| 5,088,665 A | 2/1992 | Vijgen et al. | |
| 5,320,491 A * | 6/1994 | Coleman et al. | 416/24 |
| 5,533,865 A | 7/1996 | Dassen et al. | |
| 6,729,846 B1 | 5/2004 | Wobben | |
| 7,059,833 B2 | 6/2006 | Stiesdal et al. | |
| 7,637,721 B2 | 12/2009 | Driver et al. | |
| 2003/0175121 A1 | 9/2003 | Shibata et al. | |
| 2004/0253114 A1 * | 12/2004 | Gunneskov et al. | 416/224 |
| 2007/0041823 A1 * | 2/2007 | Miller | 415/4.1 |
| 2007/0065290 A1 | 3/2007 | Herr | |
| 2007/0077150 A1 | 4/2007 | Llorente Gonzalez | |
| 2008/0061192 A1 | 3/2008 | Sullivan | |
| 2008/0080977 A1 * | 4/2008 | Bonnet | 416/229 A |
| 2008/0107540 A1 * | 5/2008 | Bonnet | 416/229 R |
| 2008/0166241 A1 | 7/2008 | Herr et al. | |
| 2008/0187442 A1 * | 8/2008 | Standish et al. | 416/235 |
| 2009/0016891 A1 | 1/2009 | Parsania et al. | |
| 2009/0074585 A1 | 3/2009 | Koegler et al. | |
| 2009/0104038 A1 * | 4/2009 | Grabau | 416/219 R |
| 2010/0028161 A1 * | 2/2010 | Vronsky et al. | 416/238 |
| 2010/0104436 A1 * | 4/2010 | Herr et al. | 416/31 |

FOREIGN PATENT DOCUMENTS

| | | |
|---|---|---|
| EP | 2028366 | 2/2009 |
| EP | 2053240 | 4/2009 |
| JP | 2000120524 A * | 4/2000 |
| JP | 2003254225 | 9/2003 |
| WO | WO 9821091 A1 * | 5/1998 |
| WO | WO2008035149 | 3/2008 |
| WO | WO2008/113349 | 9/2008 |
| WO | WO 2008131800 A1 * | 11/2008 |
| WO | WO2009/025549 | 2/2009 |

* cited by examiner

*Primary Examiner* — Edward Look
*Assistant Examiner* — Jesse Prager
(74) *Attorney, Agent, or Firm* — Dority & Manning, P.A.

(57) ABSTRACT

A rotor blade assembly is disclosed. The rotor blade assembly includes a rotor blade and a blade extension. The rotor blade has a pressure side, a suction side, a leading edge, and a trailing edge extending between a tip and a root. The rotor blade further has an aerodynamic profile. The blade extension is mounted to the rotor blade. The blade extension includes a cutaway mounting portion for mounting the blade extension to the rotor blade such that the blade extension is generally flush with at least one of the pressure side or the suction side of the rotor blade. The cutaway mounting portion defines a notch configured to locate the blade extension relative to the rotor blade.

18 Claims, 6 Drawing Sheets

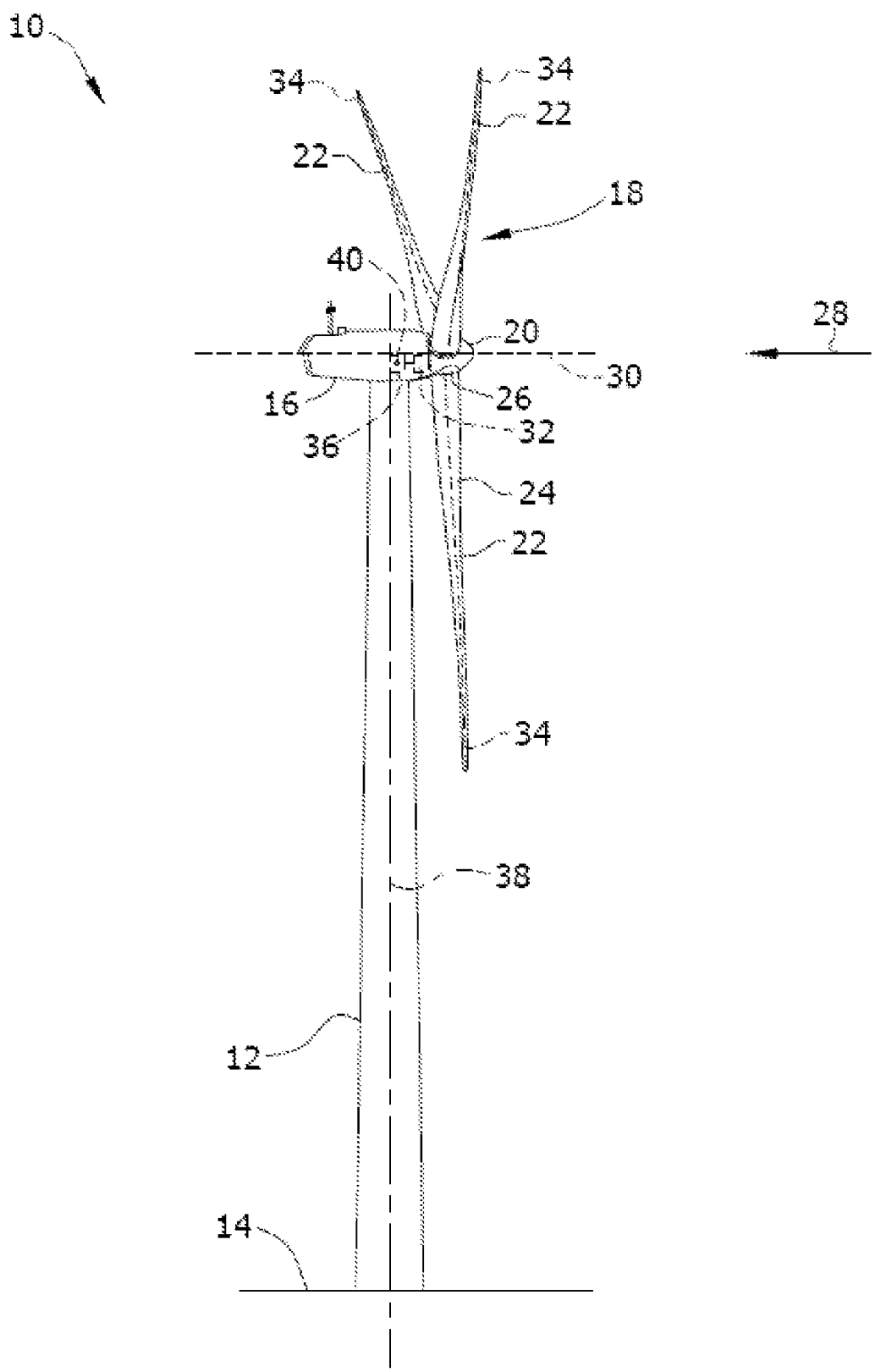
FIG. -1-

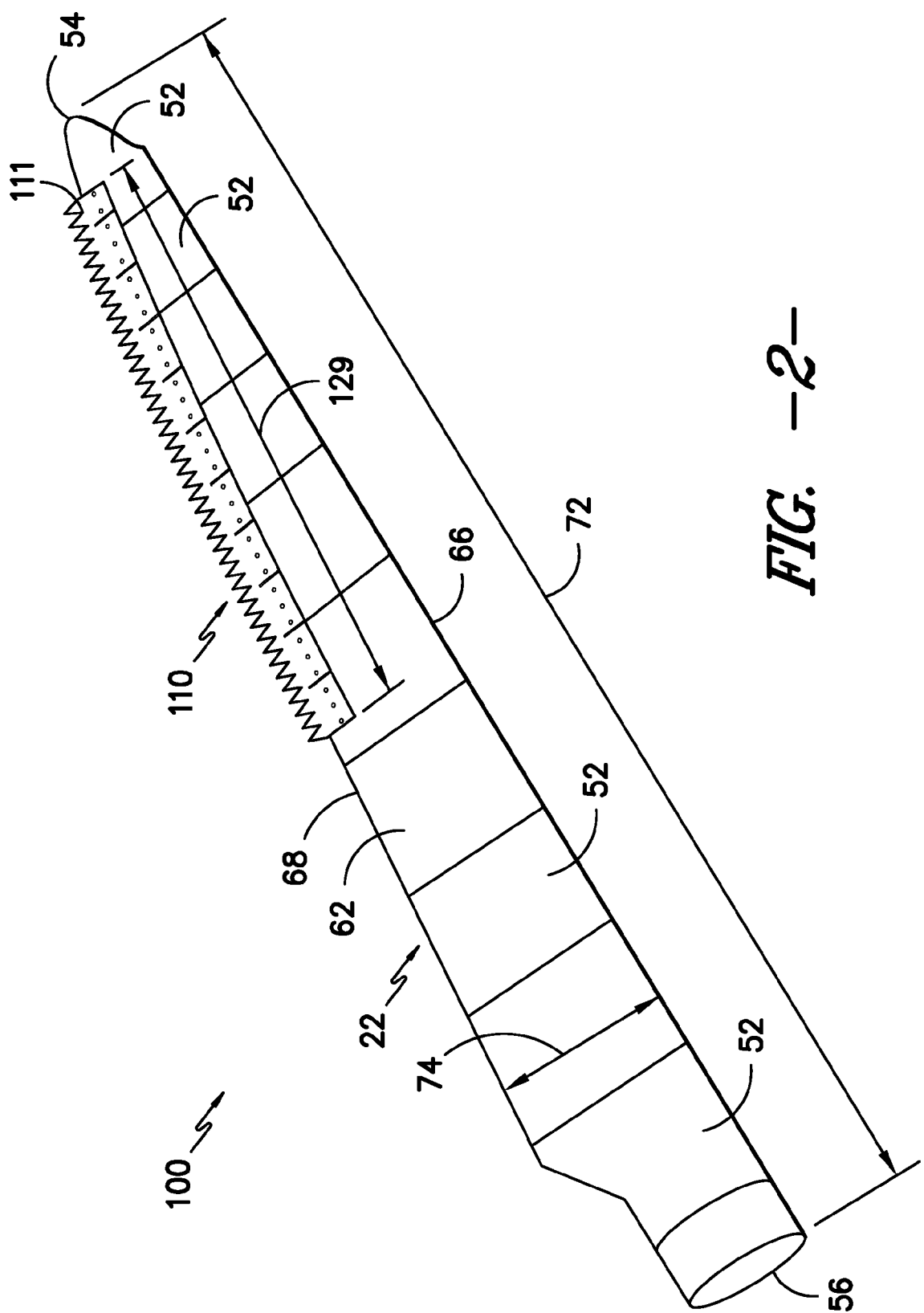
FIG. -2-

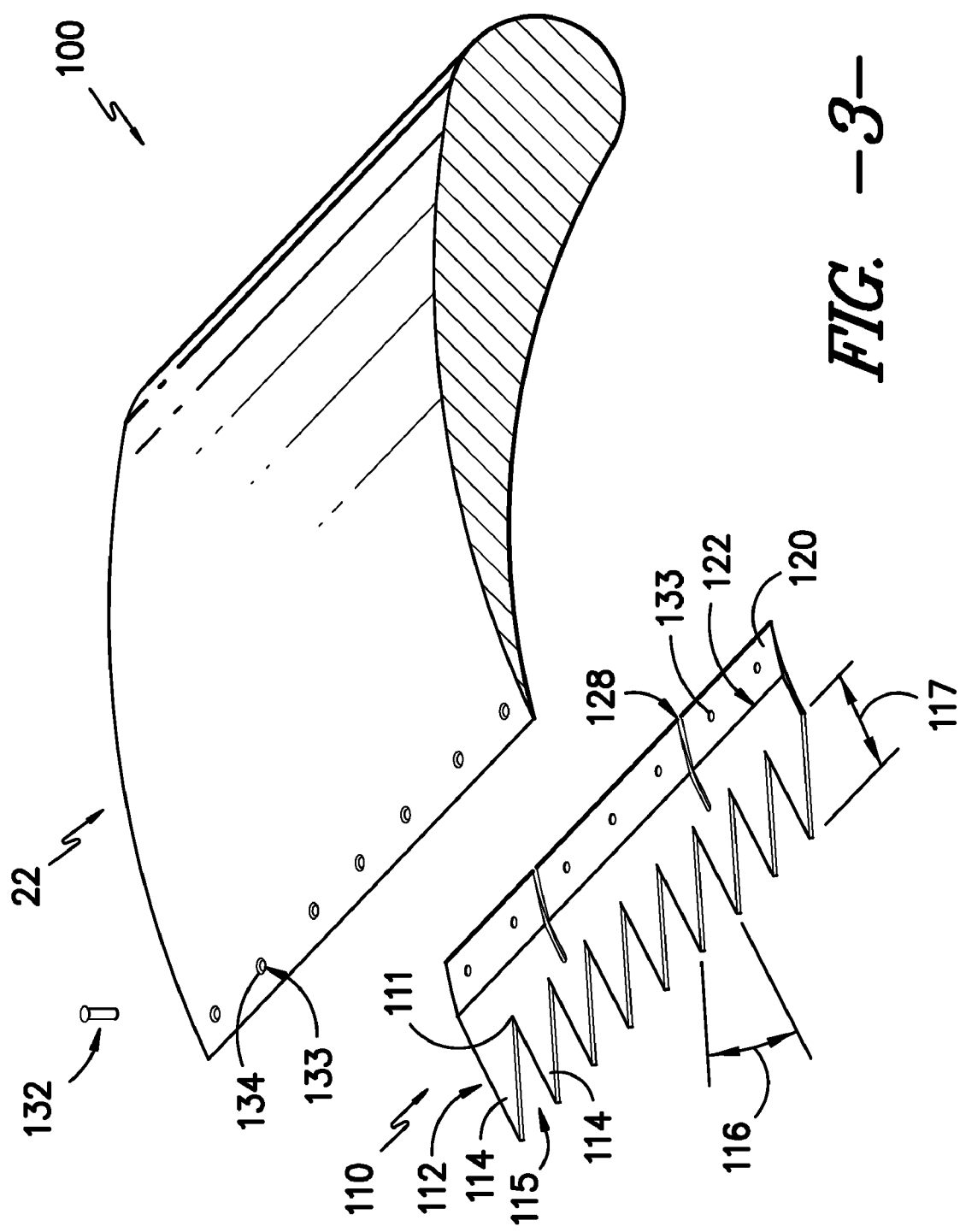

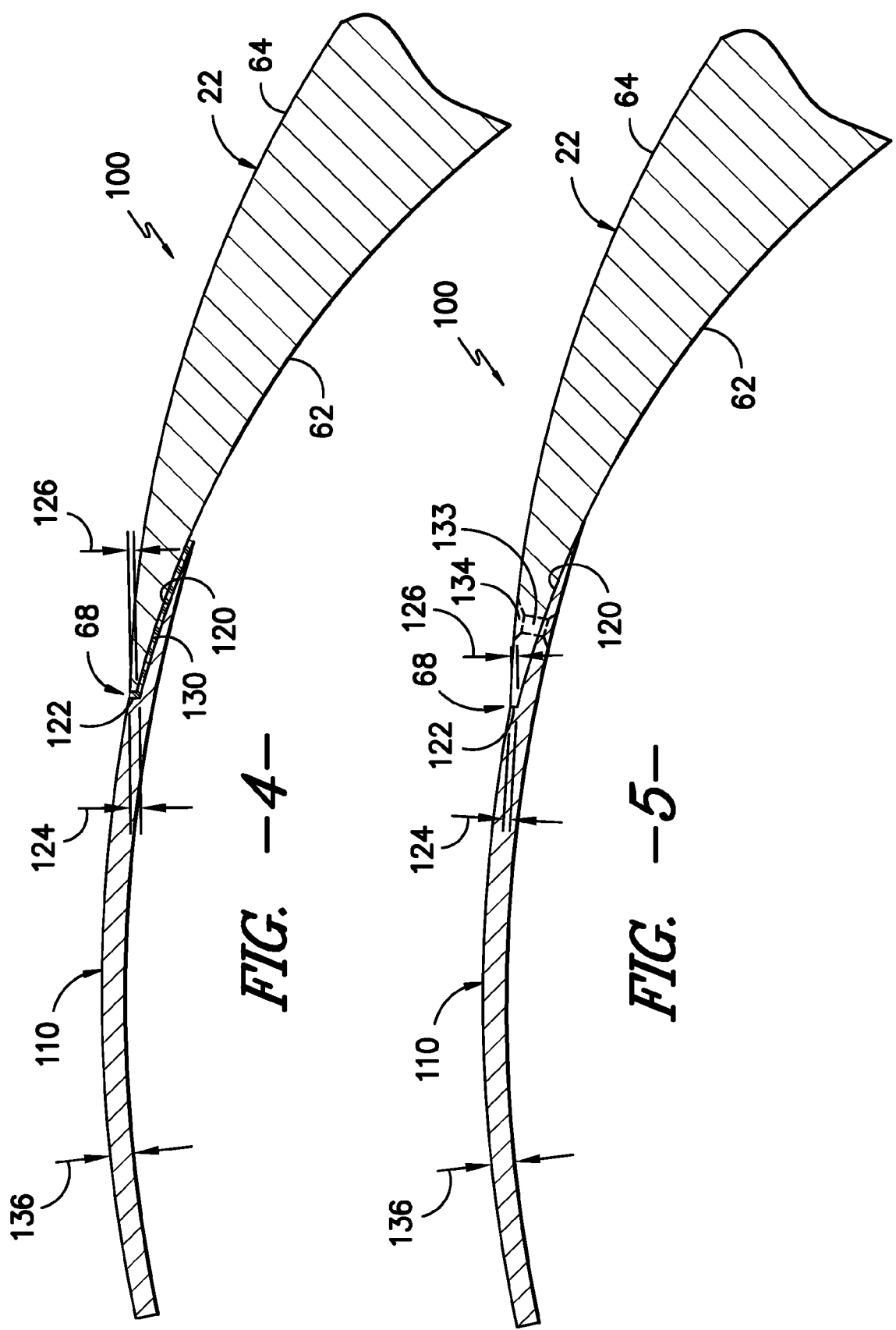

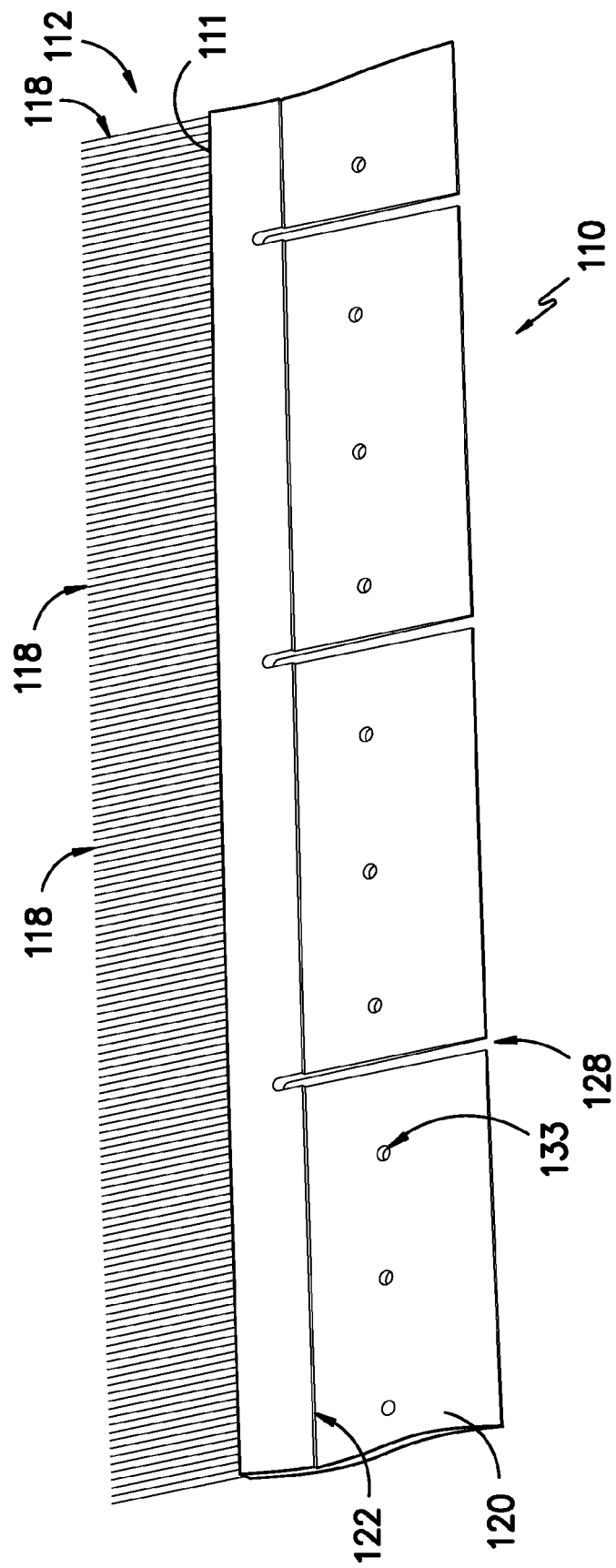
FIG. -6-

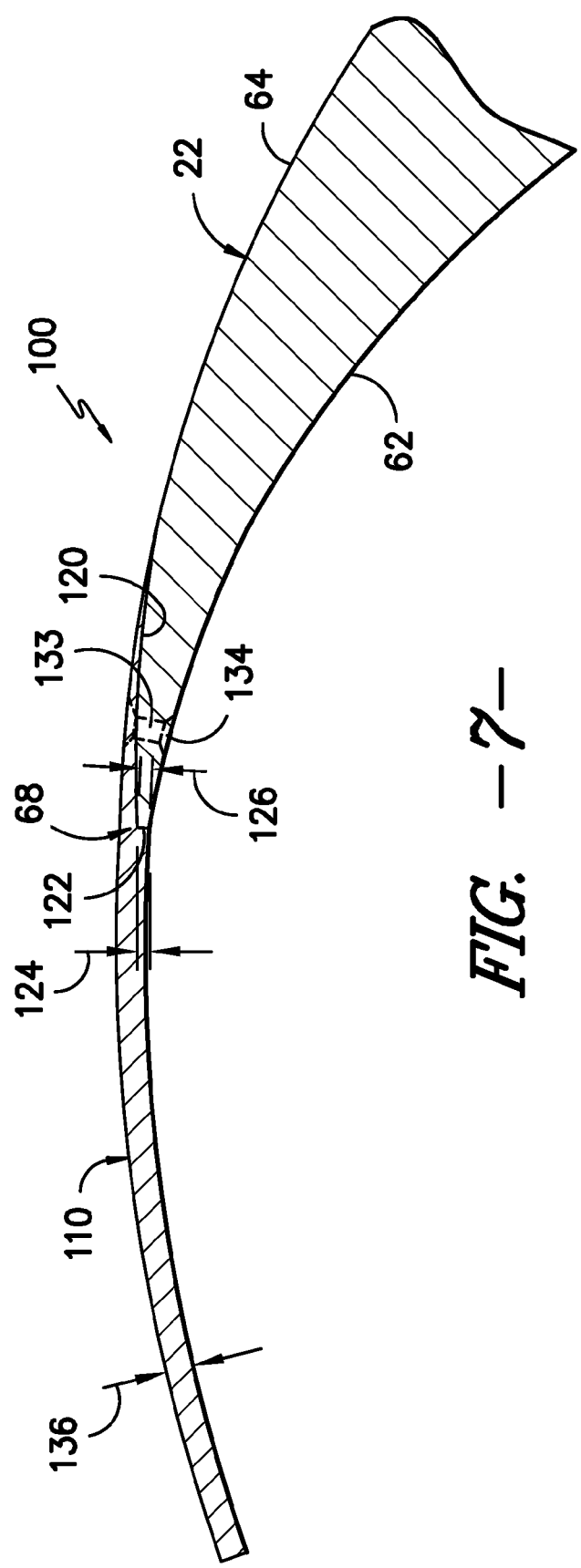
FIG. -7-

US 8,083,488 B2

BLADE EXTENSION FOR ROTOR BLADE IN WIND TURBINE

FIELD OF THE INVENTION

The present disclosure relates in general to wind turbine rotor blades, and more particularly to blade extensions mounted to the rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many cases, various components are attached to the rotor blades of wind turbines to perform various functions during operation of the wind turbines. These components may frequently be attached adjacent to the trailing edges of the rotor blades. However, these components are generally difficult to attach to the rotor blades, requiring, for example, significant modifications to both the pressure side and suction side of the rotor blades. Additionally, these modifications may be expensive and time-consuming, and may disrupt the aerodynamic profiles of the rotor blades. Additionally, various known attachment solutions prevent the components from being quickly and efficiently attached to and removed from the rotor blades as required by, for example, environmental conditions. Further, many of the components may be relatively rigid, preventing the components from conforming to the aerodynamic profiles of the rotor blades.

Thus, a blade extension that may be quickly and efficiently attached to and removed from a rotor blade would be desired. Additionally, a blade extension that minimizes any disruption of the aerodynamic profile of the rotor blade would be advantageous. Further, a rotor blade component that can conform to the aerodynamic profile of a rotor blade would be desired. Finally, a blade extension that can resist a variety of environmental conditions would be advantageous.

BRIEF DESCRIPTION OF THE INVENTION

Aspects and advantages of the invention will be set forth in part in the following description, or may be obvious from the description, or may be learned through practice of the invention.

In one embodiment, a rotor blade assembly is disclosed. The rotor blade assembly includes a rotor blade and a blade extension. The rotor blade has a pressure side, a suction side, a leading edge, and a trailing edge extending between a tip and a root. The rotor blade further has an aerodynamic profile. The blade extension is mounted to the rotor blade. The blade extension includes a cutaway mounting portion for mounting the blade extension to the rotor blade such that the blade extension is generally flush with at least one of the pressure side or the suction side of the rotor blade. The cutaway mounting portion defines a notch configured to locate the blade extension relative to the rotor blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of one embodiment of a wind turbine of the present disclosure;

FIG. 2 is a perspective view of one embodiment of a rotor blade assembly of the present disclosure;

FIG. 3 is an exploded perspective view of one embodiment of a rotor blade assembly of the present disclosure;

FIG. 4 is a cross-sectional view of one embodiment of a rotor blade assembly of the present disclosure;

FIG. 5 is a cross-sectional view of another embodiment of a rotor blade assembly of the present disclosure;

FIG. 6 is a top view of one embodiment of a blade extension of the present disclosure; and FIG. 7 is a cross-sectional view of another embodiment of a rotor blade assembly of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support surface 14, such as the ground or a platform or foundation, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support surface 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26. In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18, or a larger surface area of rotor blade 22 may be presented to the wind vectors, facilitating a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support surface 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Referring to FIGS. 2 through 7, various embodiments of a rotor blade assembly 100 in accordance with the present disclosure are shown. The rotor blade assembly 100 may include a rotor blade 22. The rotor blade 22 may extend from a blade tip 54 to a blade root 56. The rotor blade 22, in one embodiment, may include a plurality of individual blade segments 52 aligned in an end-to-end order from the blade tip 54 to the blade root 56. Each of the individual blade segments 52 may be uniquely configured so that the plurality of blade segments 52 define a complete rotor blade 22 having a designed aerodynamic profile, length, and other desired characteristics. For example, each of the blade segments 52 may have an aerodynamic profile that corresponds to the aerodynamic profile of adjacent blade segments 52. Thus, the aerodynamic profiles of the blade segments 52 may form a continuous aerodynamic profile of the rotor blade 22. Alternatively, the rotor blade 22 may be formed as a singular, unitary blade having the designed aerodynamic profile, length, and other desired characteristics.

In general, the rotor blade 22 may include a pressure side 62 and a suction side 64 (see FIGS. 3 through 5) extending between a leading edge 66 and a trailing edge 68. Further, the rotor blade 22 may have a span 72 and a chord 74.

The rotor blade 22 may, in exemplary embodiments, be curved. Curving of the rotor blade 22 may entail bending the rotor blade 22 in a generally flapwise direction and/or in a generally edgewise direction. The flapwise direction is a direction substantially perpendicular to a transverse axis through a cross-section of the widest side of the rotor blade 22. Alternatively, the flapwise direction may be construed as the direction (or the opposite direction) in which the aerodynamic lift acts on the rotor blade 22. The edgewise direction is perpendicular to the flapwise direction. Flapwise curvature of the rotor blade 22 is also known as pre-bend, while edgewise curvature is also known as sweep. Thus, a curved rotor blade 22 may be pre-bent and/or swept. Curving may enable the rotor blade 22 to better withstand flapwise and edgewise loads during operation of the wind turbine 10, and may further provide clearance for the rotor blade 22 from the tower 12 during operation of the wind turbine 10.

The rotor blade assembly 100 may further include a blade extension 110 mounted to the rotor blade 22. The blade extension 110 may be configured to perform any variety of functions. For example, in an exemplary embodiment, the blade extension 110 may be a noise reducer 111. The noise reducer 111 may reduce the aerodynamic noise being emitted from the rotor blade 22 during operation of the wind turbine 10, and/or may increase the efficiency of the rotor blade 22. Alternatively, the blade extension 110 may be, for example, a lightning receptor, a fairing, a vortex generator panel, a boundary layer turbulator, or any other component that may be fastened to the rotor blade 22 of a wind turbine 10.

In an exemplary embodiment of the present disclosure, the blade extension 110 may be fastened to the rotor blade 22 adjacent the trailing edge 68 of the rotor blade 22. Alternatively, the blade extension 110 may be fastened to the rotor blade 22 adjacent the leading edge 66 of the rotor blade 22, or adjacent the tip 54 or the root 56 of the rotor blade 22, or at any other suitable position on the rotor blade 22. Further, the blade extension 110 may be mounted on the pressure side 62 of the rotor blade 22, or on the suction side 64 of the rotor blade, as discussed below. In some exemplary embodiments, the blade extension 110 may be mounted to the rotor blade 22 only on the pressure side 62 or the suction side 64, so as to not interrupt the aerodynamic profile of the rotor blade 22 on the other side.

As discussed above, in an exemplary embodiment, the blade extension 110 may be a noise reducer 111. The noise reducer 111 may include a noise reduction or blade enhancement feature 112. The feature 112 may generally be any feature configured to alter or modify any aspect of the performance of the rotor blade 22 or wind turbine 10. For example, in embodiments wherein the feature 112 is a noise reduction feature, the feature 112 may be configured to reduce the aerodynamic noise being emitted from the rotor blade 22 during operation of the wind turbine 10, and/or may increase the efficiency of the rotor blade 22.

In one embodiment, as shown in FIGS. 2 through 5, the noise reduction feature 112 may include a plurality of projections 114. The projections 114 may be spaced apart from each other, defining indentations 115 therebetween. The projections 114 and indentations 115 may be generally V-shaped or U-shaped, or may have any other shape or configuration suitable for reducing the noise being emitted from and/or increasing the efficiency of the rotor blade 22 during operation of the wind turbine 10. Further, in exemplary embodiments, the projections 114 may be serrated, as is understood in the art, or may have any other suitable features.

The projections 114 may define angles 116 therebetween, such that the indentions 115 are defined at these angles 116. The angles 116 may generally be any angles between 0 degrees and approximately 180 degrees. For example, in exemplary embodiments, the angles 116 may be in the range from approximately 0.01 degrees to approximately 150 degrees, more particularly in the range from approximately 0.01 degrees to approximately 90 degrees, more particularly in the range from approximately 0.01 degrees to approximately 60 degrees, more particularly in the range from approximately 0.01 degrees to approximately 10 degrees.

The projections 114 may further define lengths 117, which may also be defined by the indentations 115. The lengths 117 may be any suitable lengths for reducing the noise being emitted from and/or increasing the efficiency of the rotor blade 22 during operation of the wind turbine 10. In exemplary embodiments, the lengths 117 may be greater than approximately 50 mm, more particularly greater than approximately 75 millimeters.

In exemplary embodiments, the noise reduction feature 112, such as the projections 114 and indentions 115, may be defined outside of the body of the rotor blade 22. For example, in an exemplary embodiment wherein the noise reducer 111 is mounted adjacent to the trailing edge 68 of the rotor blade 22, the projections 114 and indentations 115 may be fully defined in the noise reducer 111 beyond the trailing edge 68 relative to the chord 74.

In another exemplary embodiment, as shown in FIG. 6, the noise reduction feature 112 may include a plurality of bristles 118 extending from the noise reducer 111. The bristles 118 may be formed from, for example, natural fibers or polymer fibers. In exemplary embodiments, the bristles 118 may be formed from a polyamide (such as nylon) or a polyester. The bristles 118 may have any suitable shape or configuration suitable for reducing the noise being emitted from and/or increasing the efficiency of the rotor blade 22 during operation of the wind turbine 10.

At least one of the blade extension 110 or the rotor blade 22 according to the present disclosure may include a cutaway mounting portion 120. Thus, while the presently disclosed embodiments discuss the cutaway mounting portion 120 included on the blade extension 100, in some embodiments, the cutaway mounting portion 120 may be included on the rotor blade 22. Further, in other embodiments, the cutaway mounting portions 120 may be included on both the blade extension 100 and the rotor blade 22.

The cutaway mounting portion 120 may be provided for mounting the blade extension 110 to the rotor blade 22 such that the blade extension 110 is generally flush with at least one of the pressure side 62, as shown in FIGS. 2 through 5, or the suction side 64, as shown in FIG. 7. Further, the cutaway mounting portion 120 may define a notch 122 configured to locate the blade extension 110 relative to the rotor blade 22. For example, the cutaway mounting portion 120 may be formed in the blade extension 110 such that the notch 122 is defined having a depth 124. The depth 124 may, in exemplary embodiments, generally correspond to the thickness of the rotor blade 22 at the location on the rotor blade 22 where the notch 122 abuts the rotor blade 22. As shown in FIGS. 4 and 5, in exemplary embodiments, the depth 124 may generally correspond to the thickness 126 of the rotor blade 22 at the trailing edge 68. For example, the depth 124 may be less than the thickness 126, to account for an adhesive or other intervening material, as shown in FIG. 4, or the depth 124 may be generally equal to the thickness 126. When the blade extension 110 is mounted to the rotor blade 22, the notch 122 may be abutted against a location on the rotor blade 22, such as the trailing edge 68 or the leading edge 66, thus locating the blade extension 110 relative to the rotor blade 22.

Thus, depending on the orientation of the blade extension 110, the approximate correspondence between the depth 124 of the notch 122 and the thickness of the rotor blade 22 at the abutment location may ensure that the blade extension is generally flush with at least one of the pressure side 62 or the suction side 64. For example, according to one exemplary embodiment as shown in FIGS. 2 through 6, when the blade extension 110 is mounted to the rotor blade 22 adjacent the trailing edge 68, the cutaway mounting portion 120 may extend adjacent to the pressure side 62 of the rotor blade 22. The approximate correspondence between the depth 124 of the notch 122 and the thickness 126 of the rotor blade 22 at the trailing edge 68 may ensure that the blade extension is generally flush with the suction side 64.

Further, in some embodiments, the blade extension 110 may generally correspond with the aerodynamic profile of at least one of the pressure side 62 or the suction side 64. For example, as discussed above, the blade extension 110 may be generally flush with one of the pressure side 62 or the suction side 64. The blade extension 110 may also be contoured or bent such that the surface of the blade extension 110 that is flush with the pressure side 62 or the suction side 64 generally corresponds with the aerodynamic profile of the pressure side 62 or the suction side 64. Thus, the aerodynamic profile of one of the pressure side 62 or the suction side 64 of the rotor blade assembly 100 may be generally continuous from the rotor blade 22 through the blade extension 110.

In some embodiments, the blade extension 110 may generally correspond with the aerodynamic profile of the other of the pressure side 62 or the suction side 64. For example, as mentioned above, when the blade extension 110 is mounted to the rotor blade 22, the cutaway mounting portion 120 may extend adjacent to the pressure side 62 or the suction side 64 of the rotor blade 22, while the other of the pressure side 62 and the suction side 64 may be flush with the notch 122, as discussed above. The cutaway mounting portion 120 may further taper as it extends adjacent to the pressure side 62 or the suction side 64, as shown in FIGS. 3 through 6. The taper may be at any suitable rate, such as at a rate such that the outer surface of the blade extension 110 generally corresponds with the aerodynamic profile of the pressure side 62 or the suction side 64, as shown in FIG. 5. Thus, the aerodynamic profile of the other of one of the pressure side 62 or the suction side 64 of the rotor blade assembly 100 may be generally continuous from the rotor blade 22 through the blade extension 110.

The blade extension 110 may further define at least one, or a plurality of, contouring notches 128. The contouring notches 128 may generally be cut out portions of the blade extension 110. The contouring notches 128 may further generally be cut out from the blade extension 110 as desired along the length 129 of the blade extension 110 (defined as extending in the direction of the span 72 of the rotor blade 22). The contouring notches 128 may generally increase the flexibility of and reduce the stresses in the blade extension 110. For example, the contouring notches 128 may allow the blade extension 110, when mounted to the rotor blade 22, to generally correspond to the aerodynamic profile of the rotor blade 22, as discussed above. Additionally, the contouring notches 128 may reduce the surface area of the blade extension 110 and reduce the continuity of the surface through the length of the blade extension 110, thus reducing stresses in the blade extension 110 and allowing the blade extension 110 to more easily bend while maintaining suitable stiffness and rigidity. Further, the contouring notches 128 may allow for thermal expansion and thermal contraction of the blade extension 110. Thus, the contouring notches 128 may allow the blade extension 110 to bend and match the contours of the aerodynamic profile of the rotor blade 22.

The contouring notches 128 may have any suitable shape and size. For example, the contouring notches may be generally rectangular, or may be circular or oval-shaped, triangular, diamond-shaped, or any suitable polygonal shape.

As mentioned above, the blade extension 110 may be mounted to the rotor blade 22. In one exemplary embodiment, as shown in FIG. 4, the blade extension 110 may be mounted to the rotor blade 22 by an adhesive 130. The adhesive 130 may be applied between the cutaway mounting portion 120 and the one of the pressure side 62 or the suction side 64, thus bonding the cutaway mounting portion 120 and the one of the pressure side 62 or the suction side 64. Additionally or alternatively, the adhesive may be applied between the notch 122 and, for example, the leading edge 66 or the trailing edge 68, thus bonding the notch 122 and, for example, the leading edge 66 or the trailing edge 68.

In another exemplary embodiment, as shown in FIGS. 2, 3, 5, 6, and 7, the blade extension 110 may be mounted to the rotor blade 22 by at least one, or a plurality of, mechanical fastening devices 132. The mechanical fastening devices 132 may be, for example, rivets, bolts, nails, screws, or any other suitable fastening devices. In one exemplary embodiment, the mechanical fastening device 132 may be rivets. The rivets may be formed from, for example, metal or plastic. In an exemplary embodiment, plastic rivets may be utilized which may, for example, prevent or reduce the likelihood of lightning strikes to the rotor blade assembly 100. The mechanical fastening devices 132 may extend through bore holes 133 in the rotor blade 22 and the blade extension 100 at various suitable locations on the rotor blade 22 and the blade extension 100, thus mounting the blade extension 100 to the rotor blade 22.

Further, at least one of the rotor blade 22 or the blade extension 110 may define at least one, or a plurality of, countersinks 134. The countersinks 134 may be portions of the bore holes 133 that are widened to substantially accommodate the outer portions of the mechanical fastening devices 132. For example, the countersinks 134 may generally be portions of the bore holes 133 defined in the rotor blade 22 and/or the blade extension 110 to substantially accommodate the heads and/or tail ends of the mechanical fasteners 132. The countersinks 134 may thus allow the heads and/or tail ends of the mechanical fasteners 132 to be "sunk" into the rotor blade 22 and/or the blade extension 110 such that the heads and/or tail ends are generally flush with, or alternatively below or above, the pressure side 62 or suction side 64 of the rotor blade 22 and the blade extension 110 mounted thereon. Thus, the countersinks 134 may allow the mechanical fasteners 132 to be utilized with the rotor blade assembly 100 without substantially interrupting the aerodynamic profile of the rotor blade assembly 100.

The configuration of the blade extension 110 of the present disclosure, as discussed above, may allow the blade extension 110 be relatively quickly and efficiently attached to, properly oriented relative to, and removed from a rotor blade 22, as desired. Thus, blade extensions 110 may, in some embodiments, be relatively easily retro-fitted to existing rotor blades 22. For example, in exemplary embodiments wherein the blade extensions 110 are noise reducers 111, the noise reducers 111 may be retrofitted to existing rotor blades 22 to beneficially reduce the noise and increase the efficiency of the existing rotor blades 22.

The blade extension 110 may be formed from any suitable material. For example, in some embodiments, the blade extension 110 may be formed from fiberglass or carbon fiber, or from a metal or metal alloy. In other exemplary embodiments, however, the blade extension 110 may be formed from any suitable polymer. Particularly, in an exemplary embodiment, the blade extension 110 may be formed from an unsaturated hydrocarbon polymer. For example, the blade extension 110 may be formed from a vinyl. Particularly, the blade extension 110 may be formed from polyvinyl chloride ("PVC"). Beneficially, blade extensions 110 formed from polymers, and particularly from vinyls, may be relatively inexpensive, weatherproof, and flexible. The relative flexibility of these materials may allow the blade extensions 110 to contour as required to correspond to the aerodynamic profile of the rotor blade 22.

It should be understood that, while the blade extension 110 may be formed from any suitable material, such as a polymer, various components of the blade extension 110 may be formed from varying materials. For example, in one exemplary embodiment as discussed above, the blade extension 110 may be a noise reducer 111 including a plurality of bristles 118. The bristles 118 may, as discussed above, be formed from a different material from the remainder of the noise reducer 111.

The blade extension 110 may, in some embodiments, be relatively rigid. For example, the blade extension 110 may have a thickness 136. The thickness 136 may, in exemplary embodiments, be greater than or equal to approximately 0.5 millimeters ("mm"), more particularly in the range from approximately 1 mm to approximately 10 mm, more particularly in the range from approximately 1 mm to approximately 4 mm, more particularly in the range from approximately 1 mm to approximately 2 mm.

The blade extension 110 may be mounted to the rotor blade 22 along any portion of the span 72 of the rotor blade 22, and may further have any suitable length 129. For example, in some embodiments, the blade extension 110 may be mounted proximate the blade tip 54, as shown in FIG. 2. The blade extension 110 may, in some embodiments, have a length 129 that is approximately ¾, ⅔, ½, ⅓, ¼, ⅕, or ⅒, or any other suitable fraction thereof, of the span 72. It should be understood, however, that any suitable length 129 and positioning of the blade extension 110 are within the scope and spirit of the present disclosure. It should further be understood that more than one blade extension 110 may be mounted to the rotor blade 22 at any location on the rotor blade 22, and that the blade extensions 110 may further be adjacent to or spaced from each other.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine rotor blade assembly, comprising:
   a rotor blade having a pressure side, a suction side, a leading edge, and a trailing edge extending between a tip and a root, the rotor blade further having an aerodynamic profile; and,
   a blade extension mounted to the rotor blade,
   wherein the blade extension includes a cutaway mounting portion for mounting the blade extension to one of the pressure side or the suction side of the rotor blade such that the blade extension is generally flush with at least one of the pressure side or the suction side of the rotor blade, the cutaway mounting portion defining a notch configured to locate the blade extension relative to the rotor blade, and
   wherein the cutaway mounting portion tapers such that the blade extension generally corresponds with the aerodynamic profile of the other of the pressure side or the suction side of the rotor blade.

2. The rotor blade assembly of claim 1, wherein the blade extension is mounted to the rotor blade adjacent the trailing edge.

3. The rotor blade assembly of claim 1, wherein the blade extension generally corresponds with the aerodynamic profile of the one of the pressure side or the suction side of the rotor blade.

4. The rotor blade assembly of claim 1, the blade extension further defining at least one contouring notch.

5. The rotor blade assembly of claim 1, wherein the blade extension is mounted to the rotor blade by an adhesive.

6. The rotor blade assembly of claim 1, wherein the blade extension is mounted to the rotor blade by at least one mechanical fastening device.

7. The rotor blade assembly of claim 6, wherein at least one of the rotor blade or the blade extension defines at least one countersink configured to accommodate the at least one mechanical fastening device.

8. The rotor blade assembly of claim 1, wherein the blade extension is formed at least partially from a polymer.

9. The rotor blade assembly of claim 1, wherein the blade extension is formed at least partially from a vinyl.

10. The rotor blade assembly of claim 1, wherein the blade extension is one of a noise reducer, a lightning receptor, a fairing, a vortex generator panel, or a boundary layer turbulator.

11. A wind turbine comprising:
    a plurality of rotor blades, each of the rotor blades having a pressure side, a suction side, a leading edge, and a trailing edge extending between a tip and a root, each of the rotor blades further having an aerodynamic profile; and,
    a blade extension mounted to at least one of the plurality of rotor blades,
    wherein the blade extension includes a cutaway mounting portion for mounting the blade extension to one of the pressure side or the suction side of the at least one rotor blade such that the blade extension is generally flush with at least one of the pressure side or the suction side of the at least one rotor blade, the cutaway mounting portion defining a notch configured to locate the blade extension relative to the at least one rotor blade, and
    wherein the cutaway mounting portion tapers such that the blade extension generally corresponds with the aerodynamic profile of the other of the pressure side or the suction side of the at least one rotor blade.

12. The wind turbine of claim 11, wherein the blade extension is mounted to the at least one rotor blade adjacent the trailing edge.

13. The wind turbine of claim 11, wherein the blade extension generally corresponds with the aerodynamic profile of the one of the pressure side or the suction side of the at least one rotor blade.

14. The wind turbine of claim 11, the blade extension further defining at least one contouring notch.

15. The wind turbine of claim 11, wherein the blade extension is mounted to the rotor blade by an adhesive.

16. The wind turbine of claim 11, wherein the blade extension is mounted to the rotor blade by at least one mechanical fastening device.

17. The wind turbine of claim 16, wherein at least one of the rotor blade or the blade extension defines at least one countersink configured to accommodate the at least one mechanical fastening device.

18. The wind turbine of claim 11, wherein the blade extension is formed at least partially from a polymer.

* * * * *